US012572364B2

(12) United States Patent
Jayasingh et al.

(10) Patent No.: US 12,572,364 B2
(45) Date of Patent: Mar. 10, 2026

(54) SYSTEM AND METHOD FOR MANAGING DATA RETRIEVAL FLOW RATE USING ARTIFICIAL INTELLIGENCE ENGINE

(71) Applicant: BANK OF AMERICA CORPORATION, Charlotte, NC (US)

(72) Inventors: Magaranth Jayasingh, Chennai (IN);
Vimal Chandroliya, Gandhinagar (IN);
Sphurti Milind Deorukhkar, Mumbai
(IN); Dhivya DK, Chennai (IN);
Preethi Jagadeesan, Chennai (IN);
Rajesh Natarajan, Chennai (IN);
Senthil Kumar Selvaraj, Waxhaw, NC
(US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/791,969

(22) Filed: Aug. 1, 2024

(65) Prior Publication Data

US 2026/0037267 A1     Feb. 5, 2026

(51) Int. Cl.
G06F 9/38       (2018.01)
G06F 9/48       (2006.01)
(52) U.S. Cl.
CPC .......... G06F 9/3867 (2013.01); G06F 9/4881
(2013.01)
(58) Field of Classification Search
CPC ............................ G06F 9/3867; G06F 9/4881
USPC .................................. 707/602, 754; 711/140
See application file for complete search history.

(56) References Cited

U.S. PATENT DOCUMENTS

| | | | |
|---|---|---|---|
| 6,208,990 B1 | 3/2001 | Suresh | |
| 9,396,037 B2 | 7/2016 | Morsi | |
| 10,540,203 B2 | 1/2020 | Ravindran | |
| 10,678,632 B2 | 6/2020 | Nautiyal | |
| 10,963,479 B1 | 3/2021 | Shah | |
| 11,134,032 B1 * | 9/2021 | Bas | H04L 49/40 |
| 11,144,373 B2 | 10/2021 | Rama | |
| 11,269,911 B1 | 3/2022 | Jones | |
| 11,500,673 B2 | 11/2022 | Taher | |
| 11,500,895 B2 | 11/2022 | Fan | |
| 12,260,214 B1 * | 3/2025 | Meyer | G06F 9/3887 |
| 2015/0100542 A1 | 4/2015 | Li | |
| 2023/0206383 A1 * | 6/2023 | Szerszen | G06T 1/20 |
| | | | 345/555 |

(Continued)

*Primary Examiner* — Phong H Nguyen
(74) *Attorney, Agent, or Firm* — Moore & Van Allen
PLLC; Nicholas C. Russell

(57)                ABSTRACT

Systems, computer program products, and methods are described herein managing data retrieval flow rates using artificial intelligence engines. The present disclosure is configured to assign priority of individual data pipelines within an overseer data pipeline via a data pipeline controller, wherein the overseer data pipeline comprises a set of data pipelines, wherein the data pipeline controller utilizes an artificial intelligence engine; regulate a data flow rate for individual data pipelines within the overseer data pipeline via the data pipeline controller; compress data within the set of data pipelines within the overseer data pipeline; encrypt data within the set of data pipelines within the overseer data pipeline; pause individual data pipelines within the set of data pipelines upon receiving a signal; filter data within the overseer data pipeline; and validate data within the overseer data pipeline.

20 Claims, 7 Drawing Sheets

(56) References Cited

U.S. PATENT DOCUMENTS

| | | | | |
|---|---|---|---|---|
| 2024/0281419 A1* | 8/2024 | Alfaras | ................. | G06F 16/215 |
| 2025/0174344 A1* | 5/2025 | Cowperthwait | ....... | A61B 17/00 |

* cited by examiner

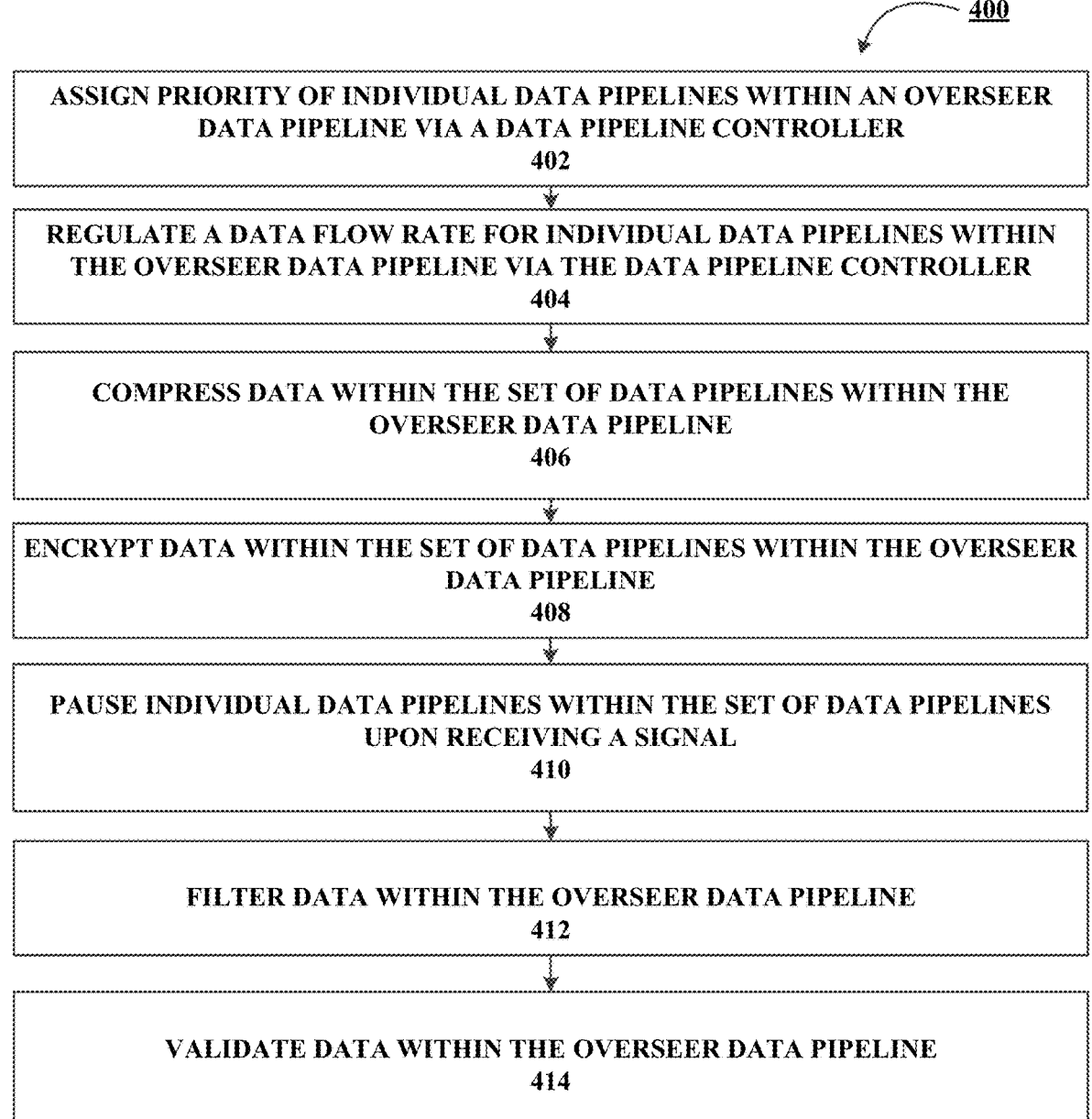

400

ASSIGN PRIORITY OF INDIVIDUAL DATA PIPELINES WITHIN AN OVERSEER
DATA PIPELINE VIA A DATA PIPELINE CONTROLLER
402

REGULATE A DATA FLOW RATE FOR INDIVIDUAL DATA PIPELINES WITHIN
THE OVERSEER DATA PIPELINE VIA THE DATA PIPELINE CONTROLLER
404

COMPRESS DATA WITHIN THE SET OF DATA PIPELINES WITHIN THE
OVERSEER DATA PIPELINE
406

ENCRYPT DATA WITHIN THE SET OF DATA PIPELINES WITHIN THE OVERSEER
DATA PIPELINE
408

PAUSE INDIVIDUAL DATA PIPELINES WITHIN THE SET OF DATA PIPELINES
UPON RECEIVING A SIGNAL
410

FILTER DATA WITHIN THE OVERSEER DATA PIPELINE
412

VALIDATE DATA WITHIN THE OVERSEER DATA PIPELINE
414

FIGURE 4

SYSTEM AND METHOD FOR MANAGING DATA RETRIEVAL FLOW RATE USING ARTIFICIAL INTELLIGENCE ENGINE

TECHNOLOGICAL FIELD

Example embodiments of the present disclosure relate to systems and methods for managing data retrieval flow rates using artificial intelligence engines.

BACKGROUND

Retrieval of data within a data flow pipe may be dependent on constructed pipelines with architecture that lacks flexibility and adjustment capabilities. Performance issues may result due to the static properties of the constructed data pipelines.

Applicant has identified a number of deficiencies and problems associated with managing data retrieval flow rate using artificial intelligence engines. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for managing data retrieval flow rates using artificial intelligence engines. In one aspect, a system for managing data retrieval flow rates using artificial intelligence engines is presented. The system comprising a processing device, at least one non-transitory storage device, and at least one processing device coupled to the at least one non-transitory storage device wherein the at least one processing device is configured to: assign priority of individual data pipelines within an overseer data pipeline via a data pipeline controller, wherein the overseer data pipeline comprises a set of data pipelines, wherein the data pipeline controller utilizes an artificial intelligence engine, regulate a data flow rate for individual data pipelines within the overseer data pipeline via the data pipeline controller, wherein regulation of the data flow rate comprises setting a data flow rate for individual data flow pipes within the data pipeline controller; compress data within the set of data pipelines within the overseer data pipeline; encrypt data within the set of data pipelines within the overseer data pipeline; pause individual data pipelines within the set of data pipelines upon receiving a signal; filter data within the overseer data pipeline; and validate data within the overseer data pipeline.

In some embodiments, validating data within the overseer data pipeline further comprises monitoring the set of data pipelines within the overseer data pipeline via a set of inputs, a set of outputs, and a set of intermediate results, wherein monitoring the set of data pipelines within the overseer data pipeline comprises detection of an anomaly within the set of inputs, the set of outputs, and the set of intermediate results.

In some embodiments, validating data within the overseer data pipeline further comprises transmitting an alert if an anomaly is detected within the overseer data pipeline.

In some embodiments, monitoring the set of data pipelines within the overseer data pipeline to detect the anomaly within the set of inputs, the set of outputs, and the set of intermediate results further comprises comparing the set of inputs with a set of baseline inputs, a set of baseline outputs, and a set of baseline intermediate results.

In some embodiments, the at least one processing device is further configured to: pause individual data flow rates within the overseer data pipeline upon reaching a predetermined threshold.

In some embodiments, pausing individual data flows within the overseer data pipeline further comprises pausing individual data pipelines upon reception of a signal.

In some embodiments, the overseer data pipeline is filtered for a set of anomalies.

In another aspect, a computer program product for managing data retrieval flow rates using artificial intelligence engines is presented. The computer program product comprising at least one non-transitory computer-readable medium having computer-readable program code portions embodied therein, the computer-readable program code portions which when executed by a processing device are configured to cause the processor to perform the following operations: assign priority of individual data pipelines within an overseer data pipeline via a data pipeline controller, wherein the overseer data pipeline comprises a set of data pipelines, wherein the data pipeline controller utilizes an artificial intelligence engine, regulate a data flow rate for individual data pipelines within the overseer data pipeline via the data pipeline controller, wherein regulation of the data flow rate comprises setting a data flow rate for individual data flow pipes within the data pipeline controller; compress data within the set of data pipelines within the overseer data pipeline; encrypt data within the set of data pipelines within the overseer data pipeline; pause individual data pipelines within the set of data pipelines upon receiving a signal; filter data within the overseer data pipeline; and validate data within the overseer data pipeline In some embodiments, validating data within the overseer data pipeline further comprises monitoring the set of data pipelines within the overseer data pipeline via a set of inputs, a set of outputs, and a set of intermediate results, wherein monitoring the set of data pipelines within the overseer data pipeline comprises detection of an anomaly within the set of inputs, the set of outputs, and the set of intermediate results.

In some embodiments, wherein validating data within the overseer data pipeline further comprises transmitting an alert if an anomaly is detected within the overseer data pipeline.

In some embodiments, monitoring the set of data pipelines within the overseer data pipeline to detect the anomaly within the set of inputs, the set of outputs, and the set of intermediate results further comprises comparing the set of inputs with a set of baseline inputs, a set of baseline outputs, and a set of baseline intermediate results.

In some embodiments, the computer-readable program code portions when executed by the processing device are further configured to pause individual data flow rates within the overseer data pipeline upon reaching a predetermined threshold.

In some embodiments, pausing individual data flows within the overseer data pipeline further comprises pausing individual data pipelines upon reception of a signal.

In some embodiments, the overseer data pipeline is filtered for a set of anomalies.

In another aspect, a computer-implemented method for managing data retrieval flow rates using artificial intelligence engines is presented. The computer-implemented method includes: assigning priority of individual data pipelines within an overseer data pipeline via a data pipeline controller, wherein the overseer data pipeline comprises a set of data pipelines, wherein the data pipeline controller utilizes an artificial intelligence engine, regulating a data flow rate for individual data pipelines within the overseer data pipeline via the data pipeline controller, wherein regulation of the data flow rate comprises setting a data flow rate for individual data flow pipes within the data pipeline controller; compress data within the set of data pipelines within the overseer data pipeline; encrypting data within the set of data pipelines within the overseer data pipeline; pausing individual data pipelines within the set of data pipelines upon receiving a signal; filtering data within the overseer data pipeline; and validating data within the overseer data pipeline In some embodiments, validating data within the overseer data pipeline further comprises monitoring the set of data pipelines within the overseer data pipeline via a set of inputs, a set of outputs, and a set of intermediate results, wherein monitoring the set of data pipelines within the overseer data pipeline comprises detection of an anomaly within the set of inputs, the set of outputs, and the set of intermediate results.

In some embodiments, wherein validating data within the overseer data pipeline further comprises transmitting an alert if an anomaly is detected within the overseer data pipeline.

In some embodiments, monitoring the set of data pipelines within the overseer data pipeline to detect the anomaly within the set of inputs, the set of outputs, and the set of intermediate results further comprises comparing the set of inputs with a set of baseline inputs, a set of baseline outputs, and a set of baseline intermediate results.

In some embodiments, the computer-implemented method further comprises pausing individual data flow rates within the overseer data pipeline upon reaching a predetermined threshold, In some embodiments, pausing individual data flows within the overseer data pipeline further comprises pausing individual data pipelines upon reception of a signal.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
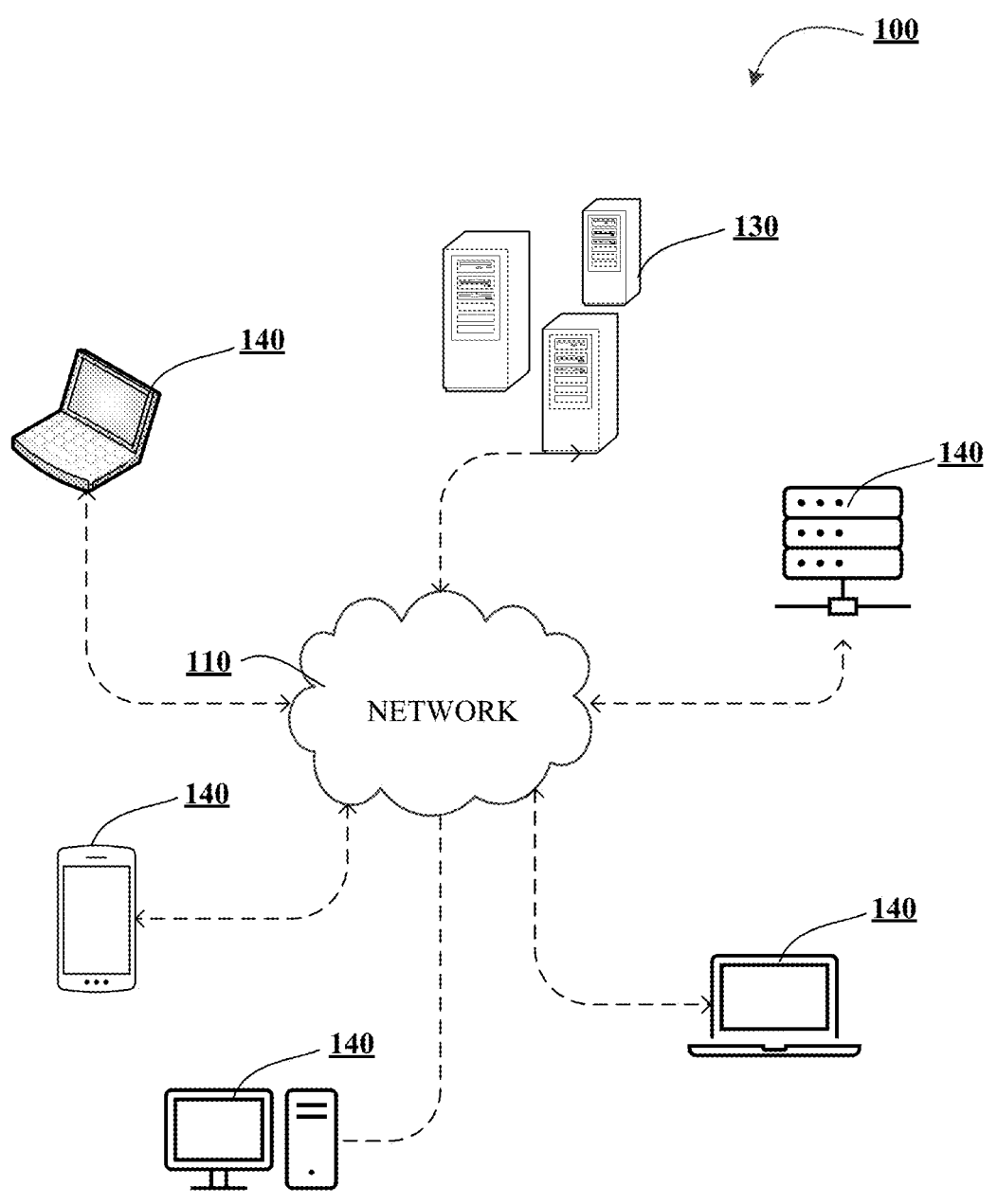
Figure 1B:
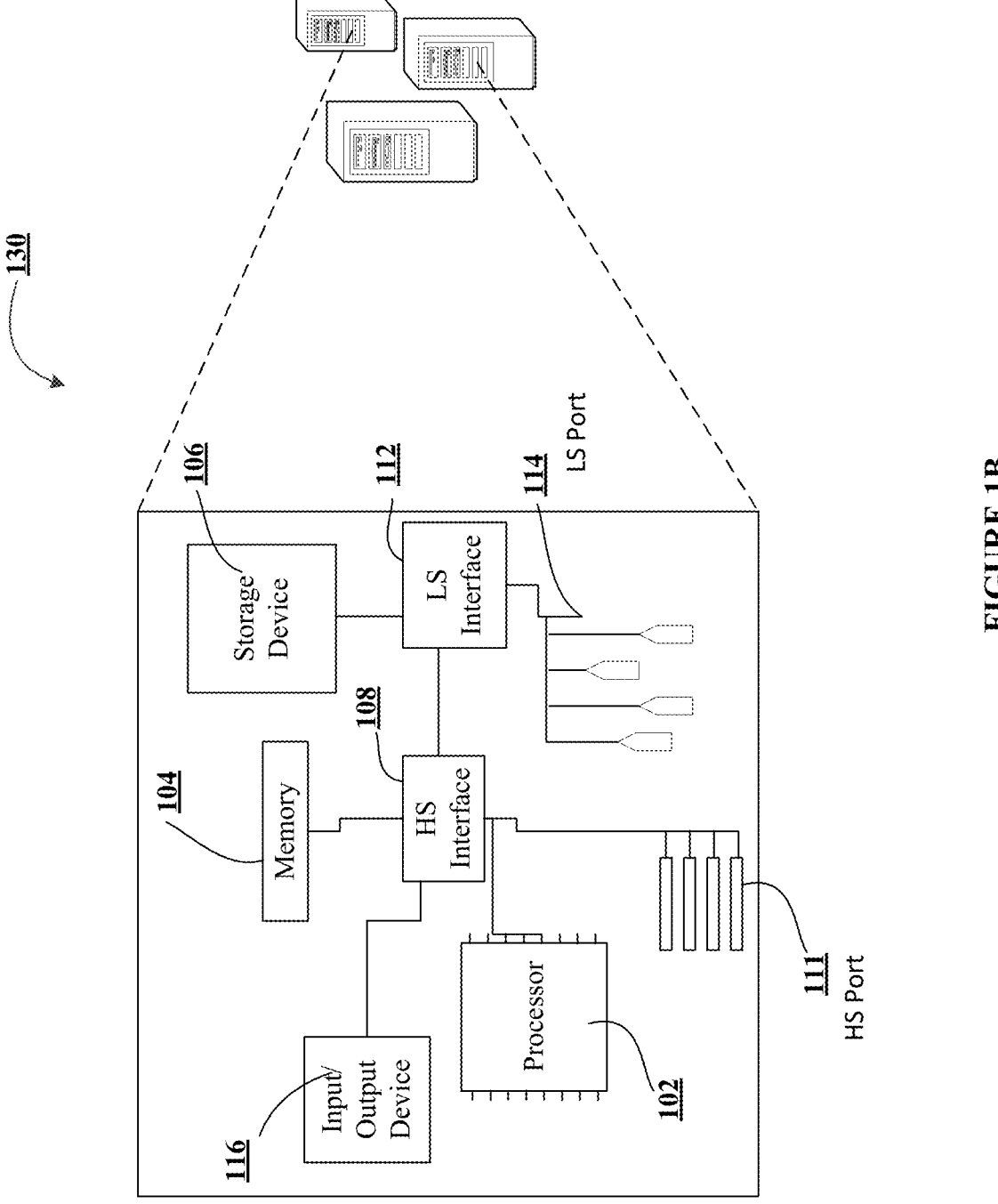
Figure 1C:
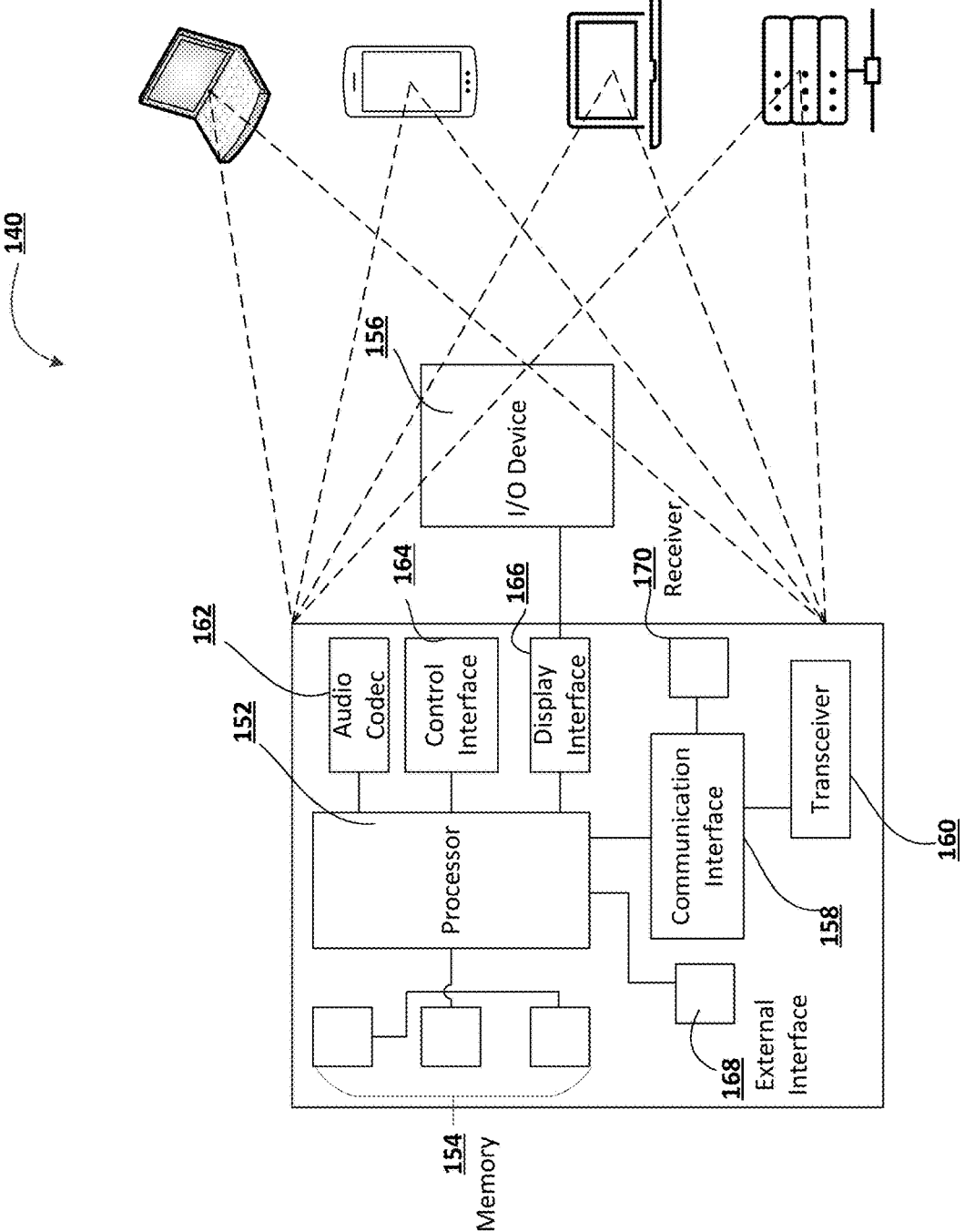
Figure 2:
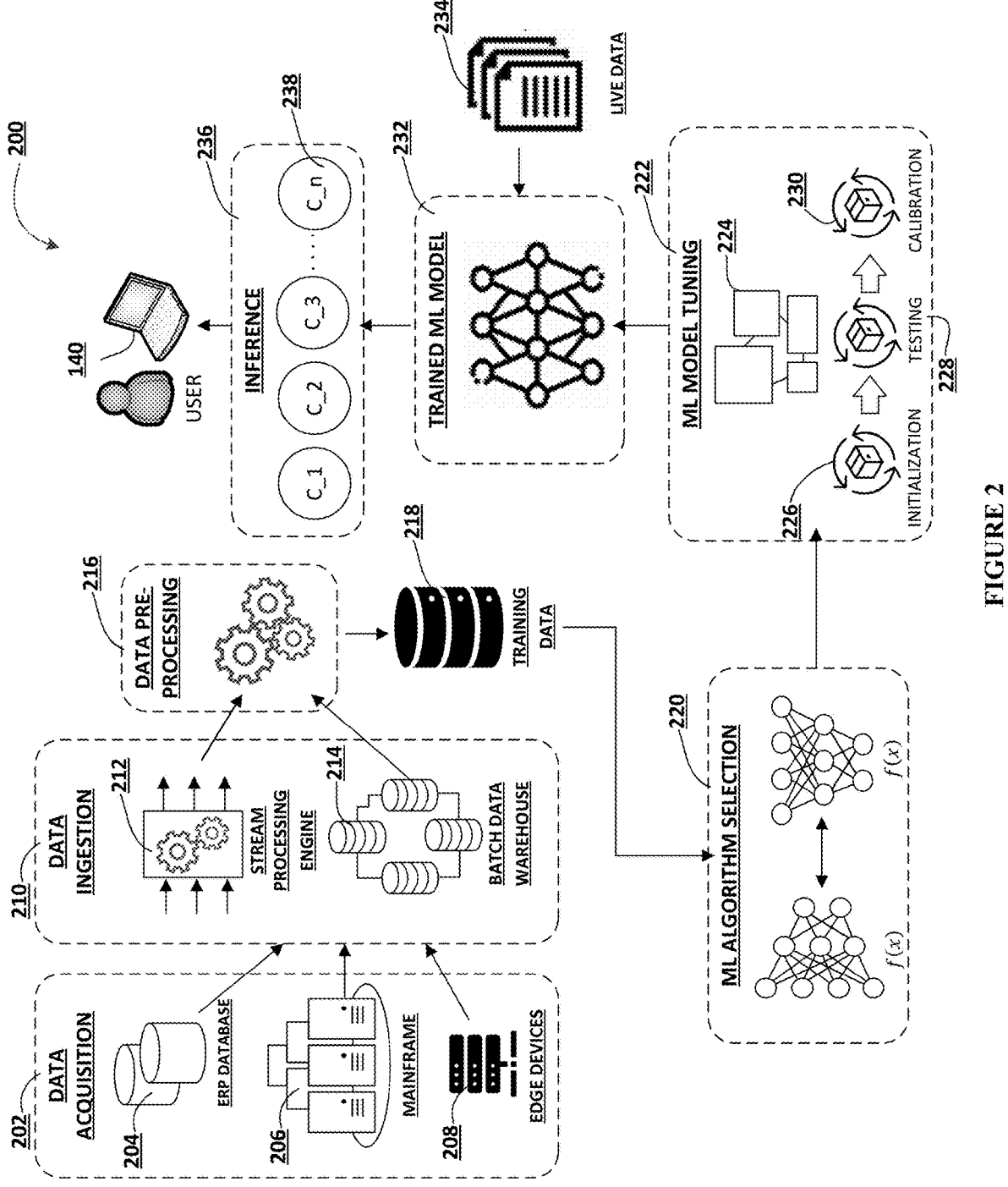
Figure 3A:
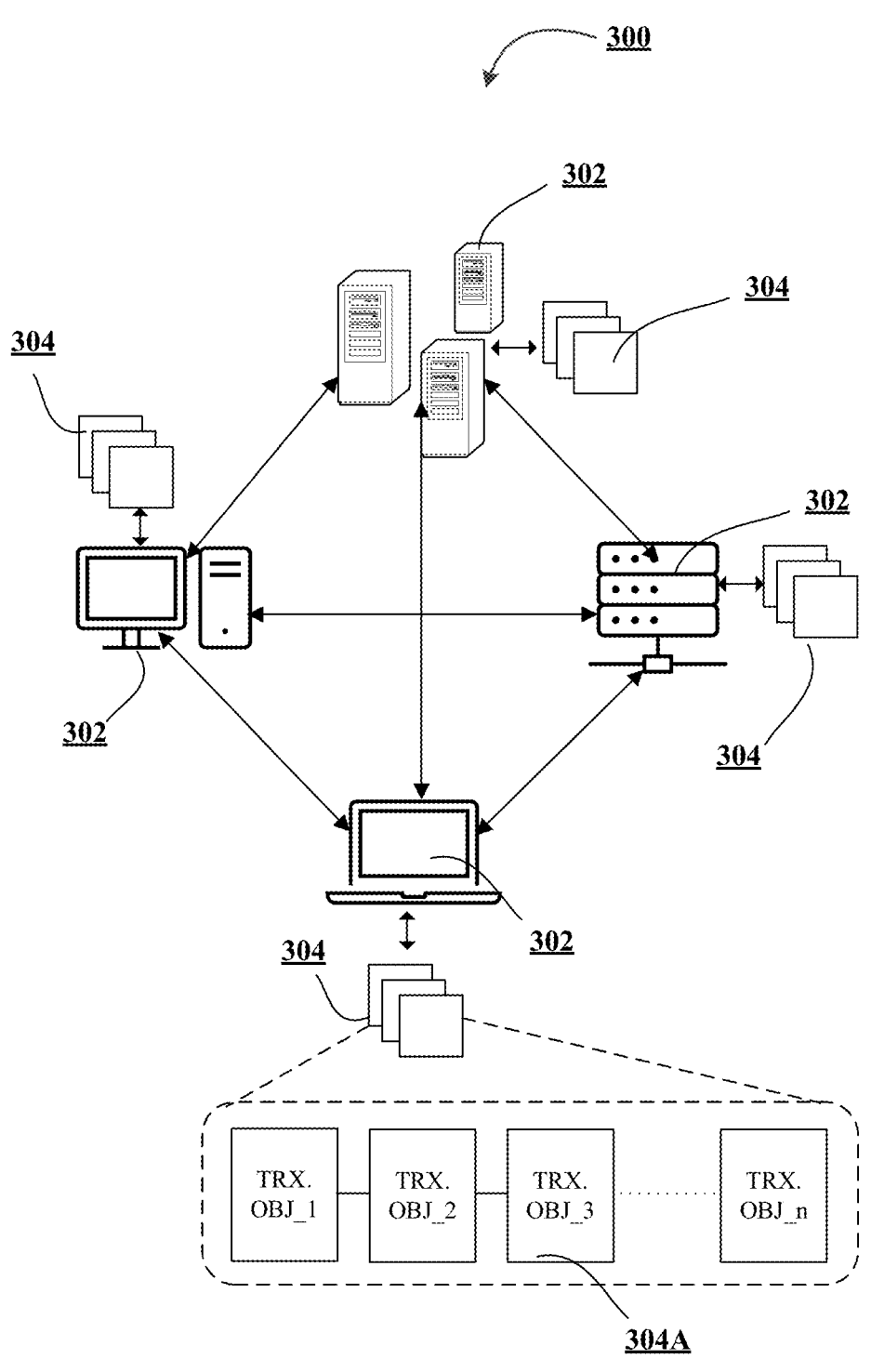
Figure 3B:
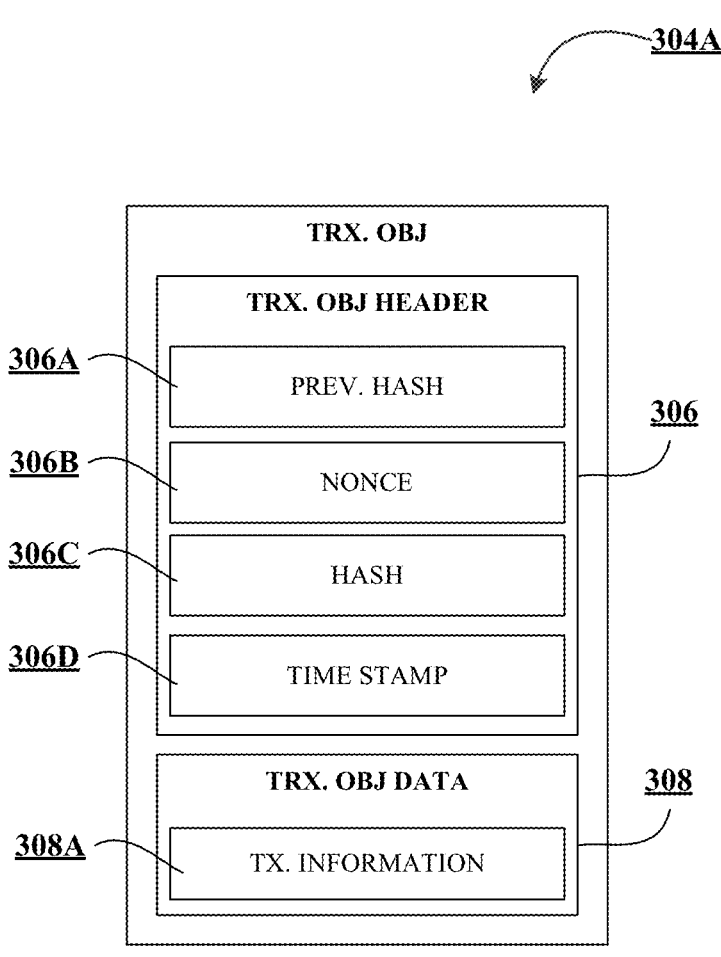

FIGS. 1A-1C illustrates technical components of an exemplary distributed computing environment for managing data retrieval flow rate using artificial intelligence engines, in accordance with an embodiment of the disclosure;

FIG. 2 illustrates an exemplary machine learning (ML) subsystem architecture in accordance with an embodiment of the disclosure;

FIGS. 3A-3B illustrate exemplary distributed ledger technology architecture, in accordance with an embodiment of the disclosure; and FIG. 4 illustrates a process flow for managing data retrieval flow rate using artificial intelligence engines, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The transfer of data within data pipelines has been reliant on structurally static infrastructure that may not be adjustable. For instance, the data flow rate within data pipelines may not be adjustable after construction.

The retrieval of data from databases, files, and applications using extract, transform, and load (ETL) pipelines which may transfer data to a secondary source. However, the data flow rate of the data pipelines may not be alterable after construction of the data pipeline. Unchanging data flow rates may cause inefficiencies as conditions change. An adaptable system that may be able to adjust data flow rates would be beneficial and increase efficiency, as the data flow rate of data pipelines may be adjusted to compensate for maintenance, changing environments, and/or encountered anomalies, the architecture and connection of components to the data pipeline.

Utilizing artificial intelligence engines, an overseer data pipeline comprised of individual data pipelines may be controlled by a data pipeline controller utilizing an artificial intelligence engine. Priority of the individual data pipelines may be assigned, and the data flow rates within individual pipelines may be adjusted or paused depending on the calculations of the artificial intelligence engine within the data pipeline controller.

Accordingly, the present disclosure provides a system, method, and computer-program product for managing data retrieval flow rates using an artificial intelligence engine. A set of data pipelines within an overseer data pipeline may be controlled, monitored, and adjusted via a data pipeline controller using an artificial intelligence engine. Individual data pipelines within an overseer data pipeline may initially be assigned priority via the artificial intelligence engine within the controller. After priority assignment, data flow rates for individual data pipelines may be regulated using the data pipeline controller. A data flow rate may be set for individual data pipelines within the set. Compression of data within the set of data pipelines may occur within or before data transmission, followed by encryption of data within the data pipelines. Flow rates for individual data pipelines within the set may be paused upon receiving a signal. Data within the set of data pipelines may further be filtered and validated within the overseer data pipeline.

What is more, the present disclosure provides a technical solution to a technical problem. As described herein, the technical problem includes managing data retrieval flow rates. The technical solution presented herein allows for managing data retrieval flow rates using artificial intelligence engines. In particular, managing data retrieval flow rate using artificial intelligence engines is an improvement over existing solutions to managing data retrieval flow rates, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for managing data retrieval flow rate using artificial intelligence engine 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2 \ldots C\_n$ 238) live data 234 based on how similar they are to one another to solve exploratory challenges where little is known about the data, provide a description or label (e.g., $C\_1$, $C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIGS. 3A-3B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 3A, the exemplary DLT architecture 300 includes a distributed ledger 304 being maintained on multiple devices (nodes) 302 that are authorized to keep track of the distributed ledger 304. For example, these nodes 302 may be computing devices such as system 130 and client device(s) 140. One node 302 in the DLT architecture 300 may have a complete or partial copy of the entire distributed ledger 304 or set of transactions and/or transaction objects 304A on the distributed ledger 304. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 3B, an exemplary transaction object 304A may include a transaction header 306 and a transaction object data 308. The transaction header 306 may include a cryptographic hash of the previous transaction object 306A, a nonce 306B-a randomly generated 32-bit whole number when the transaction object is created, cryptographic hash of the current transaction object 306C wedded to the nonce 306B, and a time stamp 306D. The transaction object data 308 may include transaction information 308A being recorded. Once the transaction object 304A is generated, the transaction information 308A is considered signed and forever tied to its nonce 306B and hash 306C. Once generated, the transaction object 304A is then deployed on the distributed ledger 304. At this time, a distributed ledger address is generated for the transaction object 304A, i.e., an indication of where it is located on the distributed ledger 304 and captured for recording purposes. Once deployed, the transaction information 308A is considered recorded in the distributed ledger 304.

FIG. 4 illustrates a process flow for managing data retrieval flow rates using artificial intelligence engines. In some embodiments, a system (e.g., similar to one or more of the systems described herein with respect to FIGS. 1A-1C) may perform one or more of the steps of process flow 400. In some embodiments, a generative artificial intelligence engine (e.g., the generative AI engine shown in FIG. 2) and/or distributed ledger technology (e.g., the exemplary DLT architecture shown in FIGS. 3A-3B) may perform some or all the steps described in process flow 400.

As shown in block 402, the process flow 400 may include the step of assigning priority of a set of data pipelines within an overseer data pipeline via a data pipeline controller. The set of data pipelines may be a group of data pipelines associated, connected, and/or controlled by the overseer data pipeline, which may assign priority to individual data pipelines within the set of data pipelines. For instance, the overseer data pipeline may be directed by the data pipeline controller to prioritize data from a second data pipeline over a first data pipeline. The second data pipeline may be prioritized based on the content of the pipeline, the structure of the data pipeline, predetermined procedures of the overseer data pipeline, and/or status of data within the data pipeline/overseer data pipeline. Assigned priority of data pipelines within the set of data pipelines may control resources associated with processing data within the set of data pipelines (e.g., a first data pipeline assigned a higher priority than a second data pipeline may have more infrastructure, power, and or assistance in processing data than a second data pipeline). In some embodiments, data pipelines designated as secured (e.g., data pipelines that have met predetermined security criteria) may be prioritized and given greater priority than unsecured data pipelines.

A data pipeline may refer to a set of processes applied to data transfers from a first source (or first plurality of sources) to a second source (or second plurality of sources). Data pipelines as described herein may refer to extract, transform, and load (ETL) pipelines, which may be a type of data pipeline. While a data pipeline may refer to the process of data movement, transformation, and storage of data from the first source to a second source, an ETL pipeline may manipulate data within the data pipeline by extracting, transforming, and loading data. The ETL pipeline may be constructed to transfer data between a first source (or first plurality of sources) to a second source (or second plurality of sources). For instance, data within a first database, server, system, file, data warehouse, cloud, application, data log, application programming interface (API), data lake and/or combination may be extracted via the data pipeline. The data extracted from the first source may then be transformed based on the data extracted, the source of the data, the destination of the data, predetermined processes associated with data transfers and/or dynamic processes utilizing machine learning, as described in greater detail below. Transforming data within the data pipeline may comprise data cleaning, integration, aggregation, enrichment, filtering, normalization, conversion compression, encryption, and manipulation of data within the data pipeline. Streaming data within the data pipeline may be conducted using a real time data pipeline, batch data pipeline, or lambda architecture (e.g., a combination of real time and batch data pipelines). Loading data within the data pipeline may comprise inserting, updating, portioning, indexing, archiving, verifying, and/or refreshing data within the data pipeline. Upon extraction, transformation, and loading, data may be transferred from the first source to the second source (or plurality of sources), as described in greater detail below.

An overseer data pipeline may refer to an overarching framework that may direct, regulate, control, dictate, guide, govern, and/or route data pipelines associated with the overseer data pipeline. The overseer data pipeline may be scaled up or down depending on the configuration of the associated data pipelines. For instance, a data pipeline may be connected, added, and/or implemented within the overseer data pipeline to expand the overseer data pipeline, or a data pipeline may be removed, disconnected, and/or replaced within the overseer data pipeline. The overseer data pipeline may be dynamically controlled via a data pipeline controller, which may alter or reroute processes within the overseer data pipeline as described in greater detail below.

The data pipeline controller may utilize an artificial intelligence engine and/or machine learning to assign priority of individual data pipelines within the set of data pipelines. The artificial intelligence engine may be the exemplary machine learning subsystem described in FIG. 2. The data pipeline controller may further direct and/or control data pipelines within the overseer data pipeline using the artificial intelligence engine. For instance, the artificial intelligence engine may assign priority of individual data pipelines within the set of data pipelines, regulate data flow rates for individual data pipelines within the overseer data pipeline, determine compression types and extent of data compression used within individual data pipelines, and pause data flow rates within individual data pipelines, as described in greater detail below.

As shown in block 404, the process flow 400 may include the step of regulating a data flow rate for individual data pipelines within the overseer data pipeline via the data pipeline controller. Regulation of the data flow rate my comprise setting a data flow rate for individual data pipelines within the set of data pipelines. For instance, a first data pipeline within the set of data pipelines may be configured to flow at a maximum level while a second data pipeline flow rate may be set to half the flow rate of the first data pipeline. Flow rates for individual data pipelines may be altered by the data pipeline controller, which may adjust the data flow rates of individual data pipelines within the overseer data pipeline. Calculations, predictions, and estimates of the flow rate for individual data pipelines may be conducted via the data pipeline controller and the machine learning capabilities.

In some embodiments, the data flow rate for individual data pipelines within the overseer data pipeline may be regulated based on the assigned priority, data within the data pipeline, history of the data pipeline, and/or characteristics of the data pipeline. For instance, a data flow rate for a data pipeline within the set of data pipelines may be calculated based on previous flow rates of the data pipeline, priority of the pipeline, and predicted data flow rates for the individual data pipeline. Regulation of the data flow rate for individual data pipelines may further comprise pausing data flows within the individual data pipelines, as described in greater detail below.

In some embodiments, the data flow rate may be set to a predicted flow rate by the data pipeline controller. For instance, the data pipeline controller may use machine learning and the artificial intelligence engine described in FIG. 2 to predict the data flow rate of a first data pipeline within the set of data pipelines. The predicted flow rate may be based on the data within the data pipeline, the infrastructure of the data pipeline, characteristics of the data pipeline, priority of the data pipeline, size of the data pipeline, and/or historic performance of the data pipeline.

As shown in block 406, the process flow 400 may include the step of compressing data within the set of data pipelines. Compression of data within the set of data pipelines may be conducted during extraction of data (e.g., data is compressed at the source), during transformation of the data (e.g., including but not limited to intermediary compression, columnar compression), and during loading of the data (e.g., including but not limited to target storage compression, file format compression). Types of compression conducted on data within the set of data pipelines may be controlled by the data pipeline controller. For instance, the type of compression utilized may be selected based on the priority of the pipeline, the data within the pipeline, and/or characteristics of the data pipeline (e.g., size, data flow rates, connections of the data pipeline). Decompression of data within the set of data pipelines may be conducted after transporting data from the first source to the second source. Decompression may be performed after conclusion of encryption, filtration, and validation of data, as described below.

As shown in block 408, the process flow 400 may include the step of encrypting data within the set of data pipelines within the overseer data pipeline. Encryption of data within the data pipeline may be determined by the data pipeline controller and/or the artificial intelligence engine. For instance, the level and type of encryption utilized may be dependent on data within the set of data pipelines, the data flow rate, characteristics of the set of data pipelines, signals from the data pipeline controller (e.g., an encryption type is chosen), and/or the extent of encryption employed on data within the set of data pipelines. Encryption of data within the set of data pipelines may be performed before entrance to the set of data pipelines or within the set of data pipelines. In some embodiments, data within the set of data pipelines may be encrypted depending on a label of data within the set of data pipelines. For instance, data designated as private may be encrypted while data without the private designation may not be encrypted.

As shown in block 410, the process flow 400 may include the step of pausing individual data pipelines within the set of data pipelines. Pausing individual data pipelines within the set of data pipelines may be initiated to consolidate resources, reallocate power/concentration, maintain data flow rates for separate data pipelines, and/or reduce data flow rates within individual data pipelines. For instance, a first data pipeline with a lower priority may be paused to increase the data flow rate of a second data pipeline within the set. In some embodiments, pausing individual data pipelines within the set of data pipelines may be adjusted via the data pipeline controller, (e.g., data flow rates for data pipelines may be viewed and paused on command via the data pipeline controller).

In some embodiments, individual data flow rates within the overseer data pipelines may be paused upon reaching a predetermined threshold, point, objective, and/or standard. For instance, an individual data pipeline within the set may be paused after a second data flow rate within the set falls below a minimum standard. In another instance, a data flow rate may be paused if a second data flow rate within the set falls below a minimum standard and the second data pipeline has been assigned a higher priority than the first data pipeline.

In some embodiments, pausing individual data flows within the overseer data pipeline further comprises pausing individual data pipelines upon reception of a signal. The signal may be received from or transmitted to the data pipeline controller. The data pipeline controller may pause an individual data flow within the overseer data pipeline based on the contents of the signal. For instance, the signal may indicate that a plurality of data pipelines within the set of individual data pipelines may be paused. In some embodiments, multiple data pipelines within the plurality may have the data flow rate reduced for each data pipeline. For instance, a signal may transmit that a first data pipeline may have the first data flow rate reduced by half while a second data flow rate may have a reduced data flow to a fourth of the current data flow.

As shown in block 412, the process flow 400 may include the step of filtering data within the overseer data pipeline. Data within the overseer data pipeline (and by extension data within the set of data pipelines) may be filtered for a predetermined set of anomalies. The predetermined set of anomalies may include but may not be limited to duplicate records, incomplete data, outliers, irrelevant data, invalid data, noise data, non-compliant data, identifiable information, historical data, user-specific data, geographical data, categories, access control, and event-based data. Filtering data within the data pipeline may be based on the individual data pipeline within the set, the priority of the individual data pipeline, and/or the data within the individual data pipeline.

As shown in block 414, the process flow 400 may include the step of validating data within the overseer data pipeline. Validation of data may be conducted to validate data types, check ranges, verify formats, check ranges, verify data consistency, validate relationships between a plurality of fields, detect duplicates, and/or checking for anomalies. Validating data within the data pipeline may further comprise transmitting an alert if an anomaly is detected within the overseer data pipeline. Validation and detection of anomalies within the overseer data pipeline may validate and detect anomalies of the set of data pipelines within the overseer data pipeline, as discussed in greater detail below.

In some embodiments, monitoring the set of data pipelines within the overseer data pipeline to detect the anomaly within the set of inputs, the set of outputs, and the set of intermediate results further comprises comparing the set of inputs with a set of baseline inputs, a set of baseline outputs, and a set of baseline intermediate results. The set of baseline inputs, the set of baseline outputs, and the set of baseline intermediate results may comprise averages, medians, observed behavior, historical performances, and/or statistical data associated with prior inputs, outputs, and intermediate results.

In some embodiments, validating data within the overseer data pipeline further comprises monitoring the set of data pipelines within the overseer data pipeline via a set of inputs, a set of outputs, and a set of intermediate results. Monitoring the set of data pipelines within the overseer data pipeline may comprise detection of an anomaly within the set of inputs, the set of outputs, and the set of intermediate results may be transmitted through source status data and structural data associated with the set of data pipelines. The set of inputs may be the data received by the set of data pipelines, characteristics of data entering the pipelines (e.g., amount of data, type of data, security of data), and/or initial conditions of data transferred within the set of data pipelines. The set of outputs may be end conditions of the data upon exiting the set of data pipelines, exit conditions of data leaving the set of data pipelines, and/or characteristics of data exiting the set of data pipelines. The set of intermediate results may be characteristics of data traveling through the set of data pipelines, statistics associated with data within the set of data pipelines, and/or condition of data within the set of data pipelines. The set of inputs, the set of outputs, and the set of intermediate results may be monitored, with detection of an anomaly within data being detected. Anomalies detected within the set of data pipelines may be comprised of errors, misidentifications, misplacements, labeling errors, invalid inputs, invalid outputs, warnings, irregularities, outliers, and the like. For instance, an anomaly detected within the set of data pipelines may be comprised of a data type error within a data pipeline. In some embodiments, monitoring the set of data pipelines within the overseer data pipeline may comprise an algorithm to monitor data within the set of data pipelines within a distributed network environment, as described in FIG. 3A-3B. For instance, an algorithm that may monitor data within the set of data pipelines may comprise using regression artificial intelligence algorithms to estimate the length of time for a data pipeline to complete a task and/or server log regression artificial intelligence algorithms to estimate the speed of a task for an individual data pipeline.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for managing data retrieval flow rates using artificial intelligence engines, the system comprising:
   a processing device;
   at least one non-transitory storage device; and
   at least one processing device coupled to the at least one non-transitory storage device, wherein the at least one processing device is configured to:
      assign priority of individual data pipelines within an overseer data pipeline via a data pipeline controller, wherein the overseer data pipeline comprises a set of data pipelines configured to transfer data between one or more sources and one or more destinations, wherein the data pipeline controller utilizes an artificial intelligence engine to determine priority based on content of data, structure of individual data pipelines, security status of individual data pipelines, and historical performance of individual data pipelines;
      regulate a data flow rate for individual data pipelines within the overseer data pipeline via the data pipeline controller, wherein regulation of the data flow rate comprises setting a data flow rate for individual data flow pipes within the data pipeline controller, wherein the data flow rate is calculated by the artificial intelligence engine based on pipeline priority and data characteristics;

compress data within the set of data pipelines within the overseer data pipeline, wherein a type and an extent of compression is selected by the artificial intelligence engine based on pipeline priority and data characteristics;
encrypt data within the set of data pipelines within the overseer data pipeline;
pause individual data pipelines within the set of data pipelines upon receiving a signal;
filter data within the overseer data pipeline; and
validate data within the overseer data pipeline.

2. The system of claim 1, wherein validating data within the overseer data pipeline further comprises monitoring the set of data pipelines within the overseer data pipeline via a set of inputs, a set of outputs, and a set of intermediate results,
   wherein monitoring the set of data pipelines within the overseer data pipeline comprises detection of an anomaly within the set of inputs, the set of outputs, and the set of intermediate results.

3. The system of claim 2, wherein validating data within the overseer data pipeline further comprises transmitting an alert if an anomaly is detected within the overseer data pipeline.

4. The system of claim 2, wherein monitoring the set of data pipelines within the overseer data pipeline to detect the anomaly within the set of inputs, the set of outputs, and the set of intermediate results further comprises comparing the set of inputs with a set of baseline inputs, a set of baseline outputs, and a set of baseline intermediate results.

5. The system of claim 1, wherein the at least one processing device is further configured to:
   pause individual data flow rates within the overseer data pipeline upon reaching a predetermined threshold.

6. The system of claim 5, wherein pausing individual data flows within the overseer data pipeline further comprises pausing individual data pipelines upon reception of a signal.

7. The system of claim 1, wherein the overseer data pipeline is filtered for a set of anomalies.

8. A computer program product for managing data retrieval flow rates using artificial intelligence engines, the computer program product comprising at least one non-transitory computer-readable medium having computer-readable program code portions embodied therein, the computer-readable program code portions which when executed by a processing device are configured to cause a processor to perform the following operations:
   assign priority of individual data pipelines within an overseer data pipeline via a data pipeline controller, wherein the overseer data pipeline comprises a set of data pipelines configured to transfer data between one or more sources and one or more destinations, wherein the data pipeline controller utilizes an artificial intelligence engine to dynamically determine priority based on content of data, structure of individual data pipelines, security status of individual data pipelines, and historical performance of individual data pipelines;
   regulate a data flow rate for individual data pipelines within the overseer data pipeline via the data pipeline controller, wherein regulation of the data flow rate comprises setting a data flow rate for individual data flow pipes within the data pipeline controller, wherein the data flow rate is calculated by the artificial intelligence engine based on pipeline priority and data characteristics;
   compress data within the set of data pipelines within the overseer data pipeline, wherein a type and an extent of compression is selected by the artificial intelligence engine based on pipeline priority and data characteristics;

encrypt data within the set of data pipelines within the overseer data pipeline;

pause individual data pipelines within the set of data pipelines upon receiving a signal;

filter data within the overseer data pipeline; and validate data within the overseer data pipeline.

9. The computer program product of claim 8, wherein validating data within the overseer data pipeline further comprises monitoring the set of data pipelines within the overseer data pipeline via a set of inputs, a set of outputs, and a set of intermediate results, wherein monitoring the set of data pipelines within the overseer data pipeline comprises detection of an anomaly within the set of inputs, the set of outputs, and the set of intermediate results.

10. The computer program product of claim 9, wherein validating data within the overseer data pipeline further comprises transmitting an alert if an anomaly is detected within the overseer data pipeline.

11. The computer program product of claim 9, wherein the computer-readable program code portions when executed by the processing device are further configured to cause the processor to:

detect the anomaly within the set of inputs, the set of outputs, and the set of intermediate results further comprises comparing the set of inputs with a set of baseline inputs, a set of baseline outputs, and a set of baseline intermediate results.

12. The computer program product of claim 8, wherein the computer-readable program code portions when executed by the processing device are further configured to cause the processor to pause individual data flow rate within the overseer data pipeline upon reaching a predetermined threshold.

13. The computer program product of claim 12, wherein pausing individual data flows within the overseer data pipeline further comprises pausing individual data flow pipes upon reception of a signal.

14. The computer program product of claim 8, wherein the overseer data pipeline is filtered for a set of anomalies.

15. A computer-implemented method for managing data retrieval flow rates using artificial intelligence engines, the method comprising:

assigning priority of individual data pipelines within an overseer data pipeline via a data pipeline controller, wherein the overseer data pipeline comprises a set of data pipelines configured to transfer data between one or more sources and one or more destinations, wherein the data pipeline controller utilizes an artificial intelligence engine to dynamically determine priority based on content of data, structure of individual data pipelines, security status of individual data pipelines, and historical performance of individual data pipelines;

regulating a data flow rate for individual data pipelines within the overseer data pipeline via the data pipeline controller, wherein regulation of the data flow rate comprises setting a data flow rate for individual data flow pipes within the data pipeline controller, wherein the data flow rate is calculated by the artificial intelligence engine based on pipeline priority and data characteristics;

compressing data within the set of data pipelines within the overseer data pipeline, wherein type and extent of compression is selected by the artificial intelligence engine based on pipeline priority and data characteristics;

encrypting data within the set of data pipelines within the overseer data pipeline;

pausing individual data pipelines within the set of data pipelines upon receiving a signal;

filtering data within the overseer data pipeline; and validating data within the overseer data pipeline.

16. The computer-implemented method of claim 15, wherein validating data within the overseer data pipeline further comprises monitoring the set of data pipelines within the overseer data pipeline via a set of inputs, a set of outputs, and a set of intermediate results, wherein monitoring the set of data pipelines within the overseer data pipeline comprises detection of an anomaly within the set of inputs, the set of outputs, and the set of intermediate results.

17. The computer-implemented method of claim 16, wherein validating data within the overseer data pipeline further comprises transmitting an alert if an anomaly is detected within the overseer data pipeline.

18. The computer-implemented method of claim 16, wherein monitoring the set of data pipelines within the overseer data pipeline to detect the anomaly within the set of inputs, the set of outputs, and the set of intermediate results further comprises comparing the set of inputs with a set of baseline inputs, a set of baseline outputs, and a set of baseline intermediate results.

19. The computer-implemented method of claim 15, wherein the computer-implemented method further comprises pausing individual data flow rates within the overseer data pipeline upon reaching a predetermined threshold.

20. The computer-implemented method of claim 19, wherein pausing individual data flows within the overseer data pipeline further comprises pausing individual data pipelines upon reception of a signal.

* * * * *